Patented July 19, 1932

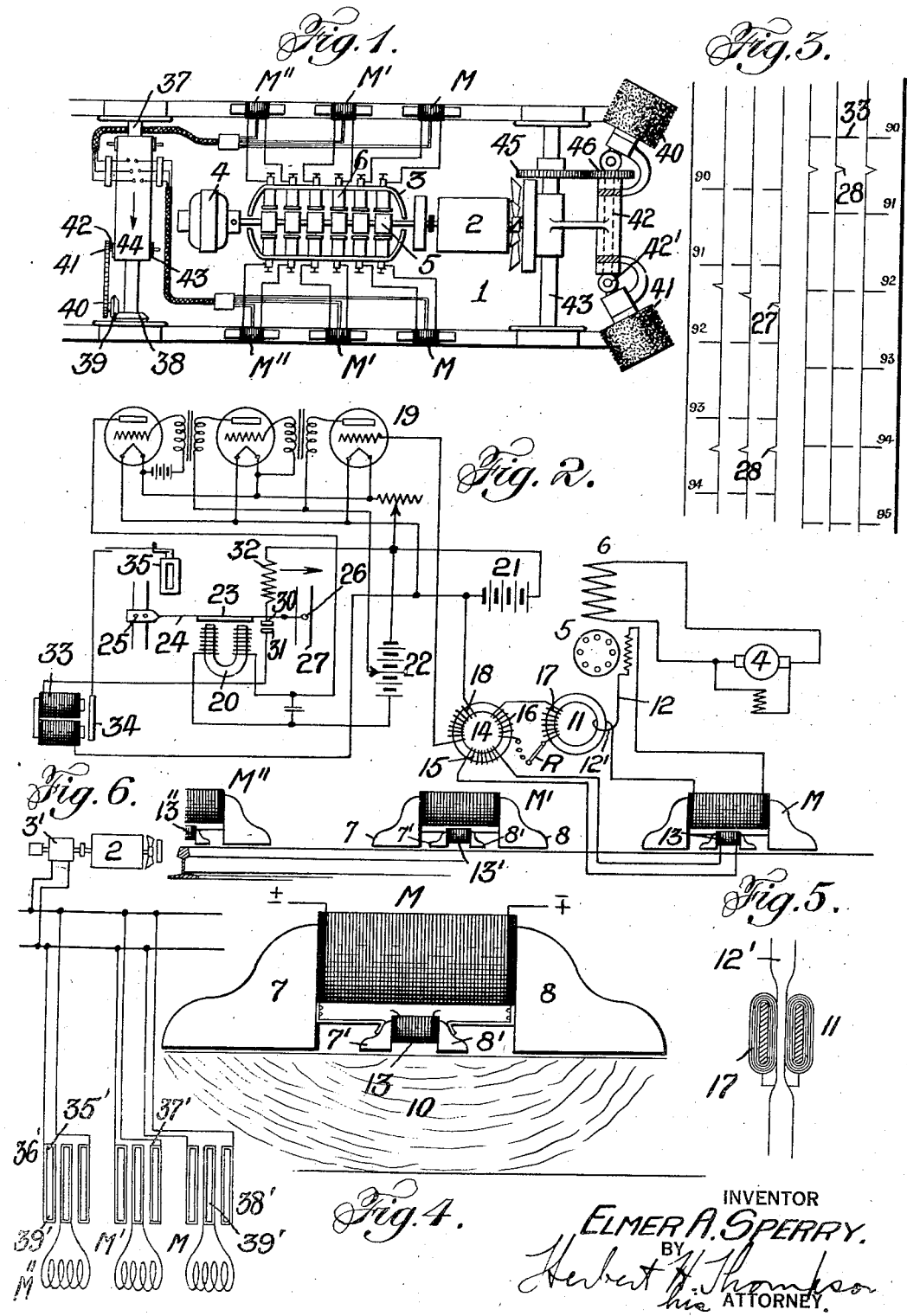

1,867,685

UNITED STATES PATENT OFFICE

ELMER A. SPERRY, OF BROOKLYN, NEW YORK, ASSIGNOR, BY MESNE ASSIGNMENTS, TO SPERRY PRODUCTS, INC., OF BROOKLYN, NEW YORK, A CORPORATION OF NEW YORK

FISSURE DETECTOR FOR MAGNETIC MATERIALS

Original application filed December 20, 1923, Serial No. 681,718. Divided and this application filed November 21, 1928. Serial No. 320,886.

This invention relates to means for detecting flaws or fissures in metal bars, rails, wire or the like, and has especial application to the detection of flaws or fissures in rails, rods or bars of iron, steel or other magnetic material. The principal use to which I propose to put my invention is in the detection of flaws in railway rails, either after laid on the track or before. When constructed for the former purpose, the device is mounted on a car which may be moved along the track, the detecting means traveling along the rail and recording on a chart or in any other manner a flaw when the car passes over the same. This invention is a divisional application of my prior application No. 681,718 for flaw detector for rails, filed December 20, 1923. The present application pertains particularly to the magnetic method of detecting flaws described but not claimed specifically in my prior application. In said prior application both direct current and alternating current systems were described as the main flux producing means, but in the present application I prefer to employ the alternating current system.

Referring to the drawing in which several forms of the invention are shown:

Fig. 1 is a diagrammatic plan view of a car with my test apparatus mounted thereon.

Fig. 2 is a wiring diagram of one of the units of my invention.

Fig. 3 is a plan view of the traveling chart showing the characteristic markings made thereon by the marking pens.

Fig. 4 is a view on a larger scale of the flux producing and flaw detecting magnets or windings.

Fig. 5 is a detailed section showing a simple form of transformer which may be used in my invention.

Fig. 6 is a diagram of a system of supply current using a single A. C. generator.

As above stated I make use of a magnetic flux for detecting flaws, which I progressively pass between spaced points along the rail under test. The apparatus is shown as mounted on a small car 1 which may either be pulled by another car or may be furnished with a small gasolene engine for self-propulsion. The car has mounted thereon a source or sources of electric supply, such as a combustion engine 2 driving one or more electric generators 3 which may be either D. C. or A. C., but in the present form of my invention I prefer A. C. generators. The generators are shown as six in number and enclosed within a single housing and there is also shown a D. C. exciter 4 for exciting the fields 6 of the generators. The armatures 5 of each generator are connected directly or indirectly to one of the main flux-producing, spaced magnets M mounted in close proximity to the rail. Each magnet is provided at each end with downwardly extending pole pieces 7 and 8. It will readily be seen that each electro-magnet M will set up a magnetic flux through the rail as indicated by the lines 10 in Fig. 4. Between each magnet and its exciting armature is placed a compensating transformer 11 for eliminating errors due to the A. C. supply. As shown but a single turn 12' of wire 12 between the generator and magnet is carried around the transformer (see Figs. 2 and 5). Between the poles 7 and 8 of magnet M is placed a detector coil, suitable windings or electro-magnet 13, preferably with similar pole pieces 7' and 8' of the highest permeability obtainable which thus provides a shunt path for the flux passing between poles 7 and 8. Obviously current would be induced in said coil 13 by the rapid variations in the magnetic flux through the rail due to the alternating exciting current of the magnet M. In case the magnet carrier does not maintain the magnets at a uniform distance above the rail for an instant, or any sudden variation in the supply takes place, which is not taken out by transformers 11 and 14, simultaneously jogs 27 will be caused in the traced lines, but since the pens are staggered, the jogs will be staggered (Fig. 3) and are easily distinguished from the flaw indications 28.

In order to prevent actuation of the recording means by such normally induced current, the leads from the detector windings 13 are first carried to a transformer 14 provided with multiple windings, the coil 13 being connected to a winding 15 on said transformer.

A second winding 16 on said transformer is connected to a winding 17 on transformer 11. If desired, an adjustable rheostat R may be provided between the windings 16 and 17. Also, on the transformer 14 is a third winding 18 which is connected directly or indirectly to the recording or indicating means.

The purpose of this construction is to prevent the normal current induced in the detector winding 13 by the A. C. supply or variations therein due to any cause from affecting the recording means so that only the variations arising at the rail and due to variations, in the path of the magnetic flux through the rail are passed on to the recording system. This is accomplished by cross connecting windings 16 and 17 on transformers 14 and 11 as described. In other words, in order to affect the induced current in winding 18, there must be variations in winding 16 which are independent of like variations in winding 17. With the windings and resistances properly designed and adjusted, this can only occur by reason of variations in the E. M. F. induced in coil 13 due to variations in the magnetic circuit through the rail.

To amplify currents reaching through and developed in the secondary 18 I may employ one or more audion bulbs 19 properly connected for amplifying the variations for useful results as in actuating a recording magnet 20. The audion tube or tubes are supplied with the usual A battery 21 and B battery 22 connected in any suitable manner to the tubes. The magnet 20 receives the amplified current from the audion set. The armature 23 of this magnet is shown as connected to a flat spring 24 anchored at 25. Said spring carries at its outer end a pen or other marker 26, the direction of movement of the chart being shown by the arrow. An ink trough 27 is shown as supplying ink to the pen. When magnet 20 is momentarily excited the armature 23 is jogged slightly, causing the pen to make a small mark 28 (Fig. 3) on the chart. When the magnet is more energetically excited, spring 24 is thrown down against yielding stop 30. Said stop is normally held a slight distance below the flat spring 24. When, however, the armature draws the spring down against the stop 30 with sufficient force the stop 30 is forced against a cooperating contact 31. This completes a circuit through resistance 32 to magnet 33 from the battery 21. Magnet 33 on attracting its armature 34 produces useful collateral results as, for instance, moving around one notch a numbering machine 35 which may, if desired, mark the numbers on the chart (see numbers 90, 91 etc. in Fig. 3) by any suitable means well known in the art. The purpose of this construction is as follows:

When a flaw in the rail (hidden or otherwise) is passed over there will be a temporary change in the potentials impressed on the winding 13 which will reach through the transformer 14 and into the amplifying system. This will cause the magnet 20 to jog the armature 23 and make a small mark 28 on the chart. When, however, a rail joint or crossing is passed over, a comparatively large potential change would be induced in the winding 13 and this would draw the armature 21 down far enough to close contacts 30 and 31, thus causing a longer mark 33 to be made on the chart and operating the numbering machine. By numbering the longer marks as shown in Fig. 3 and therefore the rails from a given starting point, it will be readily seen that the particular rail containing the flaw, may be readily found from the chart as well as the position of the flaw.

In order to secure accuracy and prevent temporary causes from giving incorrect indications, I prefer to employ a plurality of main and detector coils. As shown three such pairs of coils are provided M, M' and M'' and 13, 13' and 13'', but the circuits for one pair only are shown in Fig. 2. Each detector coil may actuate a separate pen and the results compared on the chart, or, if desired, the circuits may be so arranged that the currents induced in the detector coils are differentiated one against the other before being recorded on the chart or otherwise indicated.

The pens are preferably so arranged upon the chart and the chart's rate of progression is such (Fig. 1) that the mark made by one pen for a given rail flaw will be exactly opposite the mark made by the pen actuated by the next set of brushes. In other words, the pens are spaced apart on the chart considering the speed thereof the same proportional distance as the pairs of magnets M—13, and M'—13', and M''—13'' are spaced apart on the track. Thus it will be seen that for the rail joints almost continuous lines 33 will appear on the chart, since one pen will extend the dash made by the preceding pen. A separate set of brushes is also provided for each rail and all the pens for both rails are mounted on the same chart. It will be understood that three of the six generators 3 are used for each rail.

The chart is shown as advanced by the movement of the car. As shown one axle 37 of the car is provided with a bevel gear 38 meshing with the bevel pinion 39. Said pinion is provided with a sprocket wheel and chain 40, the sprocket chain driving the sprocket pinion 41 on the shaft 42 of the roller 43 around which the chart 44 passes and is rewound below, the chart being unwound from the roller 43'. The chart, it will be seen, will be advanced in the direction of the arrow upon the forward movement of the car.

In order that the surface of the rails as they are being tested may be as clean and free from dirt, rust and the like, as possible, I prefer to provide brushes 40, 41 which normally engage the track in front of the contact brushes. Preferably the cleaning brushes are revolved in the opposite direction to the car wheels. This may be accomplished by gearing the shaft 42 connected to the brushes to the car axle 43 by gears 45, 46 on the axle and shaft respectively. A universal joint 42' connects each brush and shaft 42.

Instead of employing a plurality of A. C. generators, I may employ a single such generator with a separate transformer for each main flux-producing coil, as shown in Fig. 6. Here the prime mover 2 is shown as driving a single A. C. generator 3'. The generator is shown as connected to the primary 35' of each of transformers 36'—37'—38'. The secondary winding 39' of each transformer is connected to one of the magnet coils M. Otherwise the construction may be as in Fig. 2. It will be understood that another set of similar transformers is provided for the other rail.

Of course, the numbering of the rails may be brought about by means other than that described above and also that the flaw-indicating means may be in a different form than marks on a chart.

From the foregoing, the operation of my invention will be understood to be substantially as follows: The car 1 is moved over the track either by being pulled as a trailer or under its own motive power, preferably at a fairly slow speed. When it is desired to begin the test, the cleaning brushes are lowered into contact with the rail and the switches thrown to energize the system. As each rail joint is passed over, three lines 33 will be marked on the chart and preferably numbered by the numbering machine 32. When a flaw is passed over a jog in the line marked by each pen will be made as indicated at 26. In case a jog appears in one line and not in the others, or in case the marks are staggered as at 27, the observer will recognize that this was probably due to some temporary condition in the circuit or in the position of the magnets with respect to the rail and not due to a flaw. As above explained, the potentials induced in the detector magnets by the A. C. supply or by variations therein will not essentially effect the operation of the system owing to the compensating windings 16—17 on the transformers 14 and 11.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting flaws in magnetic materials which consists in placing the same in a rapidly changing magnetic field, inducing an E. M. F. in suitable detector windings placed adjacent the material under test, in balancing out the E. M. F. induced under normal conditions, and actuating indicating means by the E. M. F. induced by variations in said field due to causes external to the primary or energizing system.

2. The method of detecting flaws in magnetic materials which consists in placing the same in a rapidly changing magnetic field, inducing an E. M. F. in suitable detector windings placed adjacent the material under test, causing relative movement of said material and windings, in balancing out the E. M. F. normally induced by such changing field and motion, and actuating indicating means by the E. M. F. induced by variations in said field due solely to varying conditions in the magnetic circuit through said material.

3. Apparatus for detecting flaws in magnetic material comprising an electro-magnet adapted to be placed adjacent the material under test, an A. C. supply for said magnet, a test coil adjacent said magnet and adapted to have induced thereon currents due to the changing magnetic flux through said material, means for balancing out such currents as may be induced by the A. C. supply, and means for indicating the electrical characteristics of current induced in said coil by the variation in lines of force surrounding said object.

4. Apparatus for detecting flaws in magnetic material comprising an electro-magnet adapted to be placed adjacent the material under test, an A. C. supply for said magnet, a plurality of test coils adjacent said magnet and adapted to have induced therein currents due to the changing magnetic flux through said material, and means for comparing the currents induced in the several test coils.

5. Apparatus for detecting flaws in magnetic material comprising an electro-magnet adapted to be placed adjacent the material under test, an A. C. supply for said magnet, a plurality of test coils adjacent said magnet and adapted to have induced therein currents due to the changing magnetic flux through said material, means for producing relative motion of said test coils and material, and means for comparing the currents induced in the several test coils.

6. Apparatus for detecting flaws in magnetic material comprising an electro-magnet adapted to be placed adjacent the material under test, an A. C. supply for said magnet, a plurality of test coils adjacent said magnet and adapted to have induced therein currents due to the changing magnetic flux through said material, a balancing transformer having a winding controlled by said supply and a winding controlled by said test coil and a third winding, and indicating means actuated from said third winding.

7. In a flaw detector for metallic bars, rails or the like, means for passing a magnetic flux through the mass being tested, means for detecting variations in the flux gradient at different points, and means for compensating for variations in the magnitude or direction of the flux passing through the mass for preventing such variations from adversely effecting said detecting means.

In testimony whereof I have affixed my signature.

ELMER A. SPERRY.